US009492830B2

(12) United States Patent
Krampen

(10) Patent No.: US 9,492,830 B2
(45) Date of Patent: Nov. 15, 2016

(54) METHOD OF PRODUCING A DISPENSER, DISPENSER, AND MOULD THEREFOR

(71) Applicant: Gerald Krampen, Radolfzell (DE)

(72) Inventor: Gerald Krampen, Radolfzell (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 239 days.

(21) Appl. No.: 14/180,969

(22) Filed: Feb. 14, 2014

(65) Prior Publication Data

US 2014/0231541 A1  Aug. 21, 2014

(30) Foreign Application Priority Data

Feb. 16, 2013 (DE) ........................ 10 2013 202 532

(51) Int. Cl.
*B29C 45/26* (2006.01)
*B05B 1/14* (2006.01)
*B29C 45/00* (2006.01)
*B05B 11/00* (2006.01)
*B29C 45/37* (2006.01)
*B05B 7/00* (2006.01)

(52) U.S. Cl.
CPC .............. *B05B 1/14* (2013.01); *B05B 11/30* (2013.01); *B05B 11/3001* (2013.01); *B29C 45/00* (2013.01); *B29C 45/2628* (2013.01); *B29C 45/37* (2013.01); *B05B 7/0062* (2013.01); *B29C 2045/0094* (2013.01)

(58) Field of Classification Search
CPC ....... B05B 1/14; B05B 7/0062; B05B 11/30; B05B 11/3001; B29C 45/2628; B29C 45/37; B29C 2045/0094; B29C 45/00
USPC .......................................... 239/596, 554, 555
See application file for complete search history.

(56) References Cited

U.S. PATENT DOCUMENTS

| 4,882,055 A | 11/1989 | Stamstad |
| 6,196,219 B1 | 3/2001 | Hess et al. |
| 6,460,970 B1 * | 10/2002 | Ohkuma ................ B41J 2/1606 |
| | | 347/47 |

(Continued)

FOREIGN PATENT DOCUMENTS

| DE | 89 15 689.7 U1 | 3/1991 |
| DE | 10 2007 051 487 A1 | 4/2009 |

(Continued)

OTHER PUBLICATIONS

Office Action of German Patent Office issued in German Application No. 10 2013 202 532.7 dated Sep. 26, 2013 (9 pages).

(Continued)

*Primary Examiner* — Arthur O Hall
*Assistant Examiner* — Juan C Barrera
(74) *Attorney, Agent, or Firm* — Flynn, Thiel, Boutell & Tanis, P.C.

(57) ABSTRACT

A perforated plate produced as a plastics component by injection moulding, there being provided for this purpose a mould with two mould halves which together define a cavity filled with plastics material during injection moulding, wherein the first mould half has a planar abutment surface directed towards the cavity, and the second mould half has a multiplicity of elevations rising up over a base surface, wherein, in the closed state of the mould, distal contact regions at the distal ends of the elevations butt against the abutment surface, and therefore keep the dispensing openings free of plastics material when the plastics material is being injected.

20 Claims, 6 Drawing Sheets

(56) References Cited

U.S. PATENT DOCUMENTS

| | | | | |
|---|---|---|---|---|
| 7,537,311 | B2* | 5/2009 | Eguchi | B41J 2/055 347/20 |
| 7,883,031 | B2* | 2/2011 | Collins, Jr. | A61M 11/005 128/200.14 |
| 2001/0013554 | A1* | 8/2001 | Borland | B05B 17/0638 239/1 |
| 2006/0103051 | A1* | 5/2006 | Staats | B01L 3/0268 264/297.2 |
| 2006/0124772 | A1* | 6/2006 | Pourdeyhimi | D04H 18/04 239/533.14 |
| 2006/0202385 | A1* | 9/2006 | Xu | A61M 37/0015 264/219 |
| 2007/0151920 | A1 | 7/2007 | Kay | |
| 2009/0099537 | A1* | 4/2009 | DeVoe | A61M 37/0015 604/272 |
| 2012/0126038 | A1* | 5/2012 | Carpenter | B23P 15/16 239/589 |

FOREIGN PATENT DOCUMENTS

| | | |
|---|---|---|
| DE | 20 2009 004 224 U1 | 7/2009 |
| EP | 0 714 708 A2 | 6/1996 |
| EP | 0 923 957 A1 | 6/1999 |
| WO | WO 2011/083380 A1 | 7/2011 |
| WO | WO 2012/064790 A1 | 5/2012 |

OTHER PUBLICATIONS

Search Report of European Patent Office issued in European Application No. 14155239.8 with English translation of category of cited documents dated Jun. 24, 2014 (7 pages).

* cited by examiner

METHOD OF PRODUCING A DISPENSER, DISPENSER, AND MOULD THEREFOR

CROSS-REFERENCE TO RELATED APPLICATION

This application claims the priority of German Application No. 10 2013 202 532.7, filed on Feb. 16, 2013, the disclosure of which is hereby incorporated by reference in its entirety into this application.

FIELD AND BACKGROUND OF THE INVENTION

The invention relates to a perforated plate for a dispenser, which serves for dispensing liquids, and to a nozzle unit with such a perforated plate, and to a corresponding dispenser.

The perforated plates dealt with in this document are perforated plates which are used in liquid dispensers, wherein liquid dispensers, in the present context, are intended to mean mobile, non-fixed dispensers which may be provided, in particular, for dispensing pharmaceutical liquids and medicinal rinse preparations, for dispensing cosmetic liquids and for dispensing foodstuffs. The aforementioned perforated plates are distinguished in that they have a multiplicity of dispensing openings and thus allow specific dispensing characteristics. The liquid is discharged in the form of fine jets, which may be just as advantageous for distributing a pharmaceutical in a desired manner, or for generating a gentle jet for washing out wounds, as for uniformly distributing a cosmetic liquid.

Perforated plates in conjunction with dispensers are known from the prior art, in particular in the context of dispensers with vibration devices, and therefore, for example, from EP 0 923 957 A1. Such perforated plates are produced usually by laser machining or by etching. Production usually involves fairly high outlay.

Although a perforated plate which has been produced by the method described here can also be used, in principle, in such dispensers with a vibration device, the main focus of the field of use of the perforated plates described here is such that if it is desired to have, through the perforated plate, a continuous stream of liquid which can be generated, for example, by means of a manually actuable pumping device or by pressure activation already provided for the dispensable liquid at the production stage.

SUMMARY OF THE INVENTION

The present invention has the problem of making available a cost-effectively producible perforated plate, including a method by means of which the perforated plates can be produced in a cost-effective manner for use in the aforementioned fields.

The perforated plate according to the invention, which is provided with a multiplicity of dispensing openings passing through it, can be produced by means of a method in which the perforated plate is produced as a plastics component by means of injection moulding, use preferably being made, for this purpose, of a mould with at least two mould halves which, together, define a cavity which is filled with plastics material during injection moulding. The first mould half here has a planar abutment surface directed towards the cavity. The second mould half has a multiplicity of elevations rising up over a base surface. In the closed state of the mould, in which the aforementioned two mould halves are spaced apart from one another by their minimal distance, it is provided that distal contact regions at distal ends of the elevations butt against the abutment surface, and they therefore keep the dispensing openings free of plastics material when the plastics material is being injected.

In the case of the production method proposed, it is therefore the case that a multiplicity of elevations are provided on one mould half, and these are brought into contact with the abutment surface on the other mould half prior to the plastics material being injected. This means that the injected plastics material cannot fill the cavity along those bridge-like connections, and the dispensing openings are therefore formed as a result once the plastics material has set. The abutment surface on the first mould half is of inherently planar design, and therefore all the elevations in the region of a common plane butt against the abutment surface. Between those locations at which the contact regions of the elevations butt against the abutment surface, however, it is also possible for the latter to have a non-planar shape, since this does not affect the production of the dispensing openings. It is advantageous, however, to have a planar abutment surface throughout.

The production method by means of the two mould halves is comparatively straightforward in technical terms and results in perforated plates which can be used to good effect for the aforementioned use purpose. Suitable plastics materials are, in particular, polypropylene (PP), polyethylene (PE), polyoxymethylene (POM), polybutyleneterephthalate (PBT) and cyclo-olefin copolymers (COC).

The perforated plate which can be produced by the method described is thus a perforated plate which is produced by injection moulding and has a multiplicity of dispensing openings passing through it. Since the second mould half with the multiplicity of elevations has to remain capable of being demoulded in relation to the perforated plate, the dispensing openings which pass through the perforated plate are formed such that they taper, without any undercuts, from a first side of the perforated plate to an opposite, second side of the perforated plate. Accordingly, the cross section of each dispensing opening decreases from the first side of the perforated plate, in particular from the inside, in the direction of the second side thereof, in particular in the direction of the outside, or remains the same in certain regions. An increase in the cross section, for the purpose of deformability and for reasons relating to flow, does not take place.

The first side here, in view of the installation situation, is formed preferably by the inside of the perforated plate. It is possible, however, to have installation situations in which the perforated plate has dispensing openings which increase in size in the outward direction. These then act in the manner of a throttle.

In the case of a perforated plate according to the invention, it is also provided that it has at least 25 dispensing openings, wherein the dispensing openings are arranged such that at least five dispensing openings are provided per square millimetre. In the case of 50 dispensing openings, it is therefore the case that the region of the perforated plate which has the dispensing openings passing through it is no longer than 5 mm$^2$.

The number of dispensing openings which is actually expedient depends on the specific application. It has been found to be advantageous, in the case of many applications, if the number of dispensing openings is above the aforementioned 25, in particular is 50 or more, or even if there are 100 or more dispensing openings. Furthermore, many applications also benefit from an even more reduced arrangement of dispensing openings, in which case preferably at least 10 dispensing openings are provided per square millimetre. It has been found that such fine structures can be produced cost-effectively, and to very good effect, by means of injection moulding.

The thickness of the perforated plate, which has the dispensing channels passing through it, is preferably between 0.1 mm and 1.5 mm. The thickness ranges, particularly preferably, between 0.2 mm and 0.8 mm. The abovedescribed tapered dispensing openings, which have production-related advantages, have likewise been found to be advantageous in respect of the dispensing characteristics. The opening angle of said dispensing openings from a second side, preferably the outside, in the direction of the opposite, first side of the perforated plate, in particular the inside, is preferably between 15° and 90°, in particular between 30° and 45°. Although it may be expedient, in individual cases, to provide dispensing openings which are formed by a common opening on the first side of the perforated plate, but split up into a plurality of individual openings on the second side of the perforated plate, it is considered to be advantageous, in contrast, if the dispensing openings are designed in each case as a channel which passes through the perforated plate and opens out, on both sides of the perforated plate, in each case into just one opening.

As far as the size of the dispensing openings is concerned, the minimal cross section thereof, this being provided on the second side of the perforated plate, in the direction of which the dispensing openings taper, that is to say, in particular, on the outside, has a surface area between 25 $\mu m^2$ and 10 000 $\mu m^2$. In the case of square dispensing openings, the edge length of the latter is thus preferably between 5 $\mu m$ and 100 $\mu m$. A dispensing-opening size ranging between 500 $\mu m^2$ and 2000 $\mu m^2$ is particularly advantageous.

The perforated plate according to the invention, produced by means of the method described, may have a structure in which there is no sub-portion rising up over the inside or the outside in the region of the dispensing openings. It is also possible, however, for the perforated plate to be part of a nozzle unit for a dispenser, said nozzle unit, alongside this perforated plate, having further components which are connected in one piece thereto and are produced in a single injection-moulding operation. Provision may thus be made, in particular, for a fastening frame connected in one piece to the perforated plate, or for other fastening means, which encloses/enclose the perforated plate and is/are provided for securing on a dispensing head of a dispenser. Since the perforated plate may have a very small thickness, such a fastening means may be suitable to facilitate handling of the perforated plate during installation. In particular, such a fastening frame can provide the perforated plate with portions and surfaces which serve for securing the perforated plate. These may be, for example, plastics-material latching means or the like which are fastened in a force-fitting or form-fitting manner on corresponding mating components of a dispensing head. The aforementioned fastening frame preferably has a thickness which is greater than that of the perforated plate in the region of the dispensing openings.

The aforementioned perforated plate or the aforementioned nozzle unit is used in a dispenser according to the invention, wherein the latter also has a liquid store and a connecting channel between the liquid store and a nozzle unit.

As already explained, such a dispenser can be used in different fields where it is desired to dispense liquids. These include dispensing pharmaceutical liquids which are dispensed through the perforated plate in the form of individual thin spray jets. The liquids can be administered here, for example, nasally, orally or topically. In particular also the task of dispensing liquids such as, for example, water for the purpose of washing wounds can be performed by a dispenser according to the invention. In the field of cosmetics, the perforated plate can generate a very homogeneous spray pattern, which is advantageous, for example, in the case of self-tanning preparations, but also in other cosmetic liquids. In addition, other fields of use, for example for dispensing liquid foodstuffs, are also conceivable.

The perforated plate according to the invention is used, in particular in the case of a dispenser according to the invention, as a partition wall between a chamber pressurized by the liquid upstream of the perforated plate and the exterior surroundings. In the case of such a dispenser, it is exclusively liquid which passes into the aforementioned chamber, the liquid then being forced through the dispensing openings. The dispensing openings act as nozzles. They convert some of the liquid pressure into kinetic energy, by way of which the liquid is dispensed in the form of spray jets.

As already indicated in the introduction, a perforated plate according to the invention can also be used in a dispenser which is known per se and in which liquid is made to vibrate electrically and is thus pushed in pulses through the perforated plate. The use of a perforated plate according to the invention, however, is provided in particular in those dispensers in which there is a continuous stream of liquid through the dispensing openings of the perforated plate at least over time periods greater than 0.05 seconds. For this purpose, a dispenser according to the invention preferably has a manual pumping mechanism, by means of which liquid is pressure-activated out of the liquid store, wherein this pressure activation directly pushes the liquid through the dispensing opening of the perforated plate. An additional vibration device is not provided. It is also possible for an outlet valve to be arranged upstream of the perforated plate and for the dispenser to have a pressure store, by means of which liquid in the liquid store of the dispenser is subjected to pressure on a permanent basis, wherein opening and closing of the outlet valve make it possible for the liquid to flow to the perforated plate, with the liquid being dispensed through the perforated plate in the process.

A mould for producing a perforated plate of the type described is preferably such that it has two mould halves which, in the closed state of the mould formed thereby, butt against one another and bound a cavity which remains between them. The first mould half here has the already mentioned planar abutment surface, which is directed towards the cavity. The second mould half has the likewise already mentioned elevations, which rise up over a base surface and have a contact region provided at their distal ends in each case, wherein the contact regions of all the elevations are arranged in a common plane, and therefore, in the closed state of the mould, they butt simultaneously against the planar abutment surface. Such a mould is preferably produced from metal. The elevations of the mould are provided preferably in a matrix-like arrangement.

In respect of the preferred production method for producing such moulds, which method will be described in more detail hereinbelow, it is preferably provided that the elevations are bounded by a plurality of side surfaces, wherein said side surfaces are each formed such that all the normal vectors to any desired part of a side surface are arranged in a common normal-vector plane or parallel to said plane. The number of side surfaces of the elevations is preferably between three and six, in particular preferably four. The aforementioned configuration of the side surfaces provides that all the normal vectors to each of the side surfaces are located parallel to a normal-vector plane. In the simplest case, the side surfaces themselves are each planar. It is also possible, however, for them to be curved in relation to one of their directions of extent, as will be explained, in particular, in the exemplary embodiments which are yet to be described hereinbelow.

In a manner corresponding to the shaping of these elevations, a perforated plate according to the invention is preferably provided with dispensing openings which are bound by a plurality of side surfaces, wherein said side surfaces are each formed such that all the normal vectors to any desired part of a side surface are arranged in a common normal-vector plane or parallel to said plane. It is also the case for all other proposals in this document relating to shaping and configuration of the elevation that this is descriptive of the complementary shaping and configuration of the dispensing openings of the perforated plate according to the invention.

It is also advantageous if the side surfaces of a plurality of elevations of the mould or of dispensing openings of the perforated plate are aligned with one another, and therefore the normal-vector plane of a side surface of one elevation is arranged parallel to the normal-vector plane of a side surface of another, adjacent elevation, or of another dispensing opening.

The side surfaces of the elevations or of the dispensing openings enclose preferably an angle between 7.5° and 45°, in particular between 15° and 22.5°, with a surface normal to the base surface of the second mould half or a correspondingly oriented reference direction of the perforated plate. This angle here is between the reference direction, on the one hand, and, on the other hand, an imaginary line which connects the outer edge of a foot of the elevation to the centre of the contact region at the distal end of the elevation. In a manner corresponding to the desired thickness of the perforated plate, the cavity between the base surface of the second mould half and the abutment surface of the first mould half preferably has a thickness between 0.1 mm and 1.5 mm, in particular between 0.2 mm and 0.8 mm.

The injection mould described may be produced such that, proceeding from a metallic blank, a plurality of rectilinearly extending grooves, at least some of which cross over, are introduced into the blank, wherein the regions remaining between the grooves from the elevations. The desired structure with a multiplicity of elevations can thus be achieved, proceeding from a flat blank, solely by virtue of the grooves being introduced. The grooves can be introduced here, for example, by a cutting operation.

A multiplicity of in each case equally spaced-apart grooves are preferably introduced in two directions offset in relation to one another through 90°, therefore resulting in the aforementioned matrix structure of elevations, which gives a matrix structure of the dispensing openings in the perforated plate.

It has been found to be particularly advantageous to produce the grooves by wire erosion. In this case, preferably an eroding wire is guided through the blank, in a repeatedly rising and falling movement, transversely to the direction of extent of said wire, which remains the same throughout this method step, a plurality of parallel grooves being produced one after the other in this way. The desired matrix structure is achieved if this is repeated twice, or even more frequently, with offset directions of extent of the eroding wire.

BRIEF DESCRIPTION OF THE DRAWINGS

Further aspects and advantages of the invention can be gathered from the claims and the following description of preferred exemplary embodiments of the invention, which will be explained with reference to the figures, in which:

DETAILED DESCRIPTION

Figure 1A:
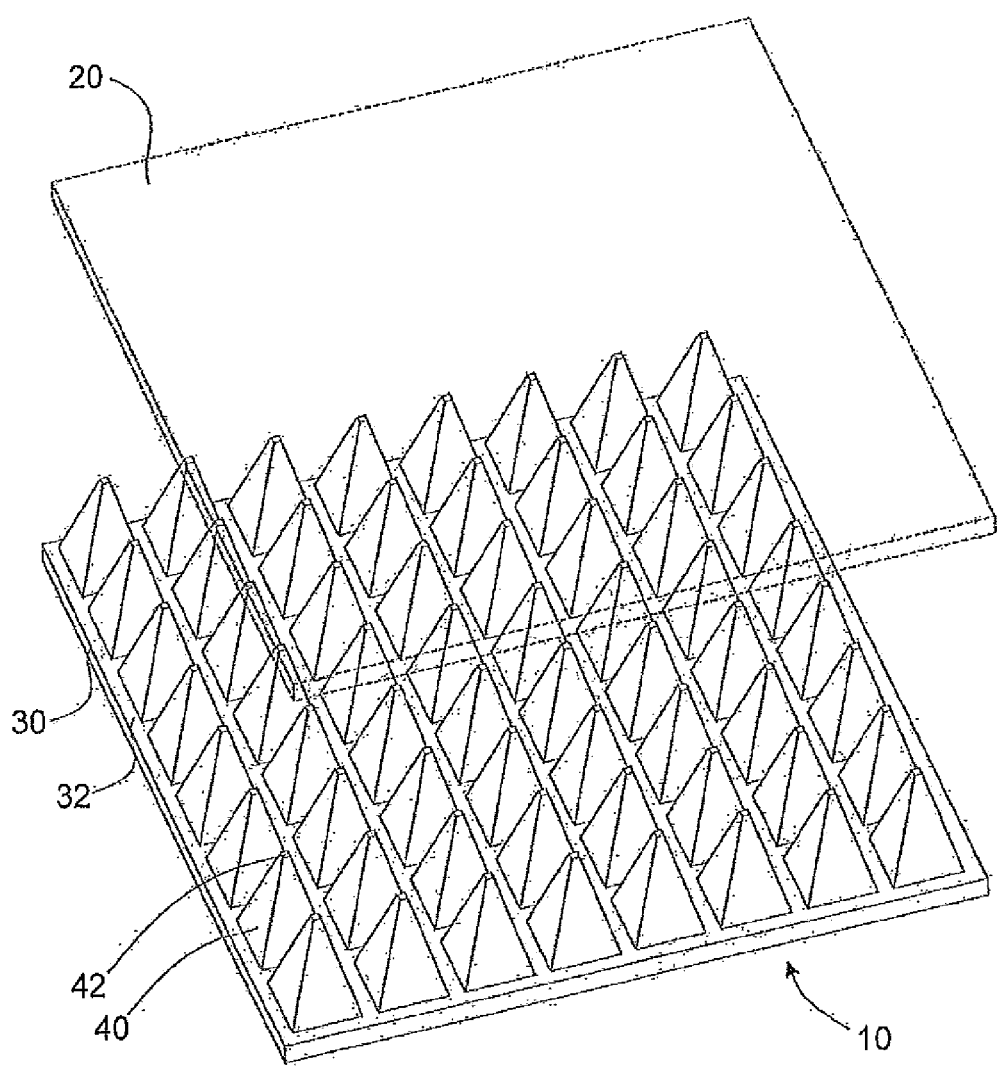
FIG. 1a shows, schematically, the construction of a mould for producing a perforated plate according to the invention.

FIG. 1a shows, in schematic form, a mould 10 for producing a perforated plate according to the invention. Said mould has two components each assigned to one of the two halves of the mould 10, that is to say, on the one hand, an abutment surface 20 (illustrated by dashed lines), which is designed to be planar in the direction of the cavity 12 of the mould 10. Provided opposite this is a second component 30, which has a base surface 32, over which a multiplicity of elevations 40 rise up. In the present example of FIG. 1, said elevations 40 are each in the form of a truncated pyramid, and they therefore terminate in a planar contact region 42 at their end which is directed away from the base surface 32. All the contact regions 42 of the elevations 40 are located in a common plane, and they can therefore be brought simultaneously into abutment with the abutment surface 20.

A configuration with 64 elevations 40 is provided here. This should be understood purely by way of example. Depending on the use purpose, it is also possible to provide a smaller number of elevations 40 and, in particular, also a considerably higher number of elevations 40. Furthermore, configuring the elevations with square shaping in the region of the base surface 32 is not imperative. It would also be possible here to predetermine, for example, a triangular shaping.

Figure 1B:
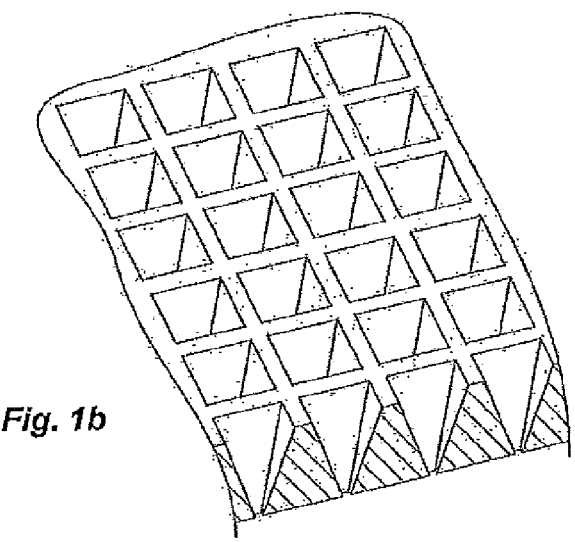
FIG. 1b shows a detail of a perforated plate which has been produced using the mould according to FIG. 1a, FIGS. 2a to 2d show the production of a perforated plate using a mould corresponding to FIG. 1a, FIGS. 3a to 3c show the method used for producing the mould itself with the elevations rising up over a base surface.

FIG. 1b shows what a perforated plate 60 which has been produced by said mould 10 looks like. Tapering dispensing openings 60a in the form of a truncated cone can be gathered from this figure.

Figure 2A:
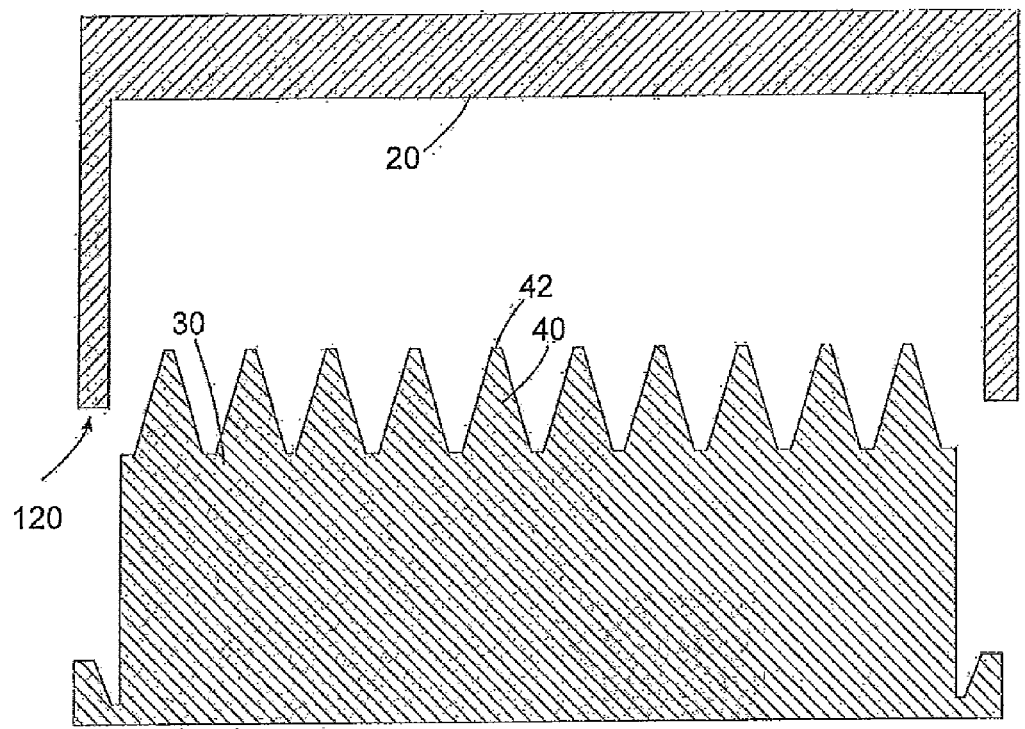
Figure 2B:
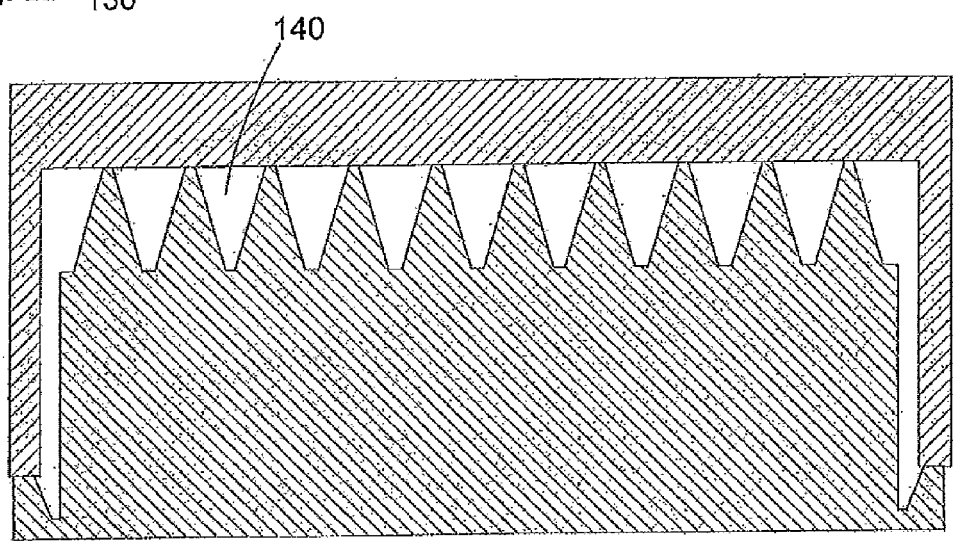
Figure 2C:
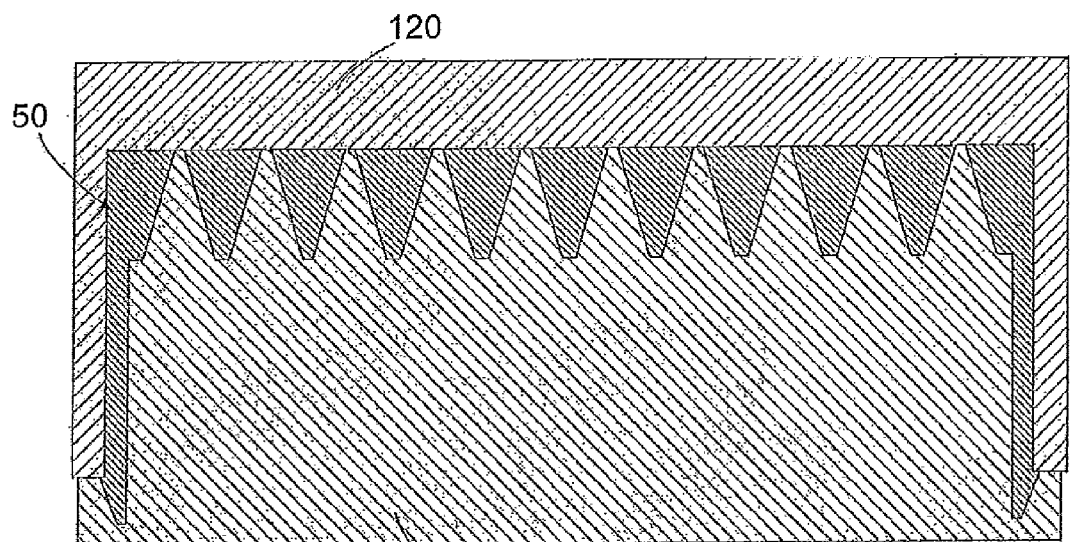
Figure 2D:
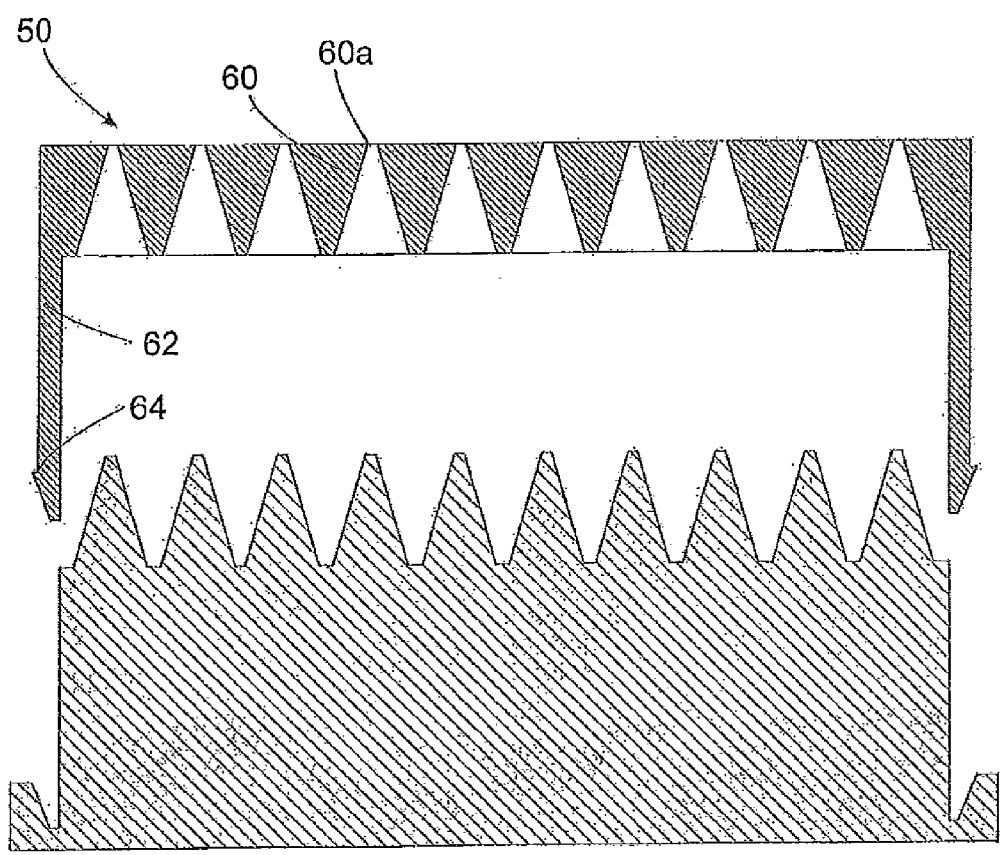

FIGS. 2a to 2d show how the components 20, 30 are used as parts of two mould halves 120, 130 for producing a nozzle unit according to the invention with a perforated plate according to the invention. The components 20, 30 are each assigned to one of the mould halves 120, 130. The mould halves 120, 130 also have further portions which, together, bound a cavity 140, which is illustrated in FIG. 2b. If, once the mould has been closed, said cavity 140 is filled with liquid plastics material, for example polypropylene, this results, once the latter has set, in a nozzle unit 50, which is illustrated in FIG. 2d and, alongside a perforated plate 60, also comprises a fastening frame 62, which encloses said perforated plate and has latching noses 64.

Figure 5:
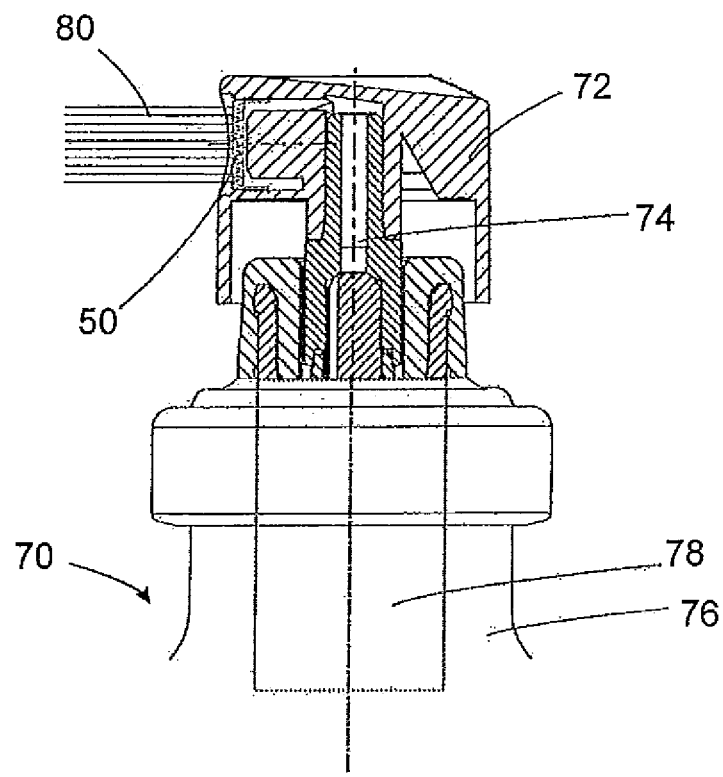
FIG. 5 shows a dispenser equipped with a nozzle unit with a perforated plate according to the invention.
Figure 5:
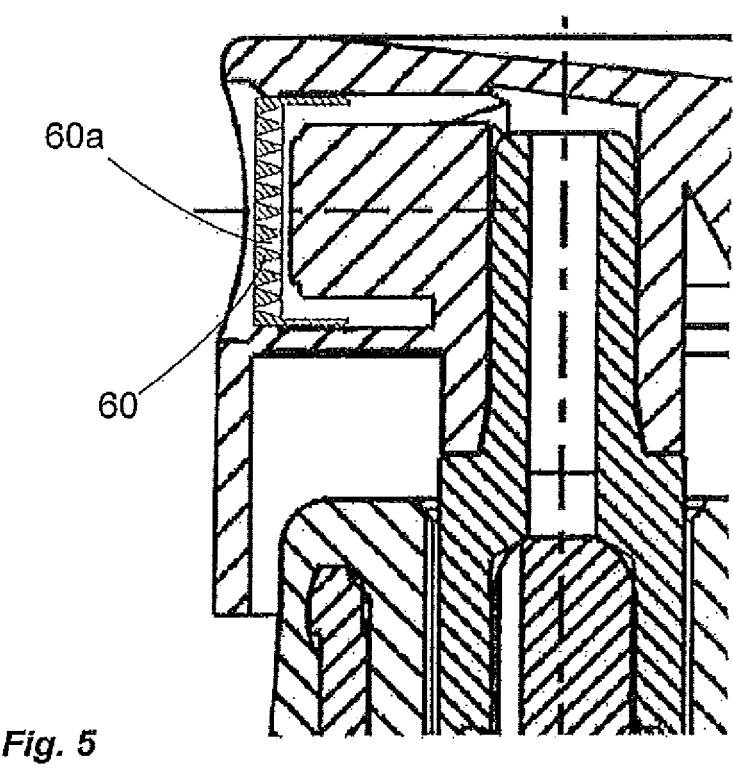

Said nozzle unit 50 can be inserted into the dispensing head 72 of a dispenser 70 in the manner illustrated in FIG. 5. It is connected there, via a connecting channel 74, to a liquid store 76, and this makes it possible for internally pressure-activated liquid to be pushed against the perforated plate 60, and dispensed through the perforated plate in the form of a multiplicity of thin spray jets 80. This means that the pressure which is present upstream of the perforated plate 60 is converted into the kinetic energy of these spray jets. The liquid can be subjected to pressure here in that the dispenser 70 has a pumping device 78, for example in the manner of a piston pump. As an alternative to this, it would also be possible for the subassembly 78 to comprise a straightforward valve to regulate the through-flow of pressure-activated liquid. In such a case, prior pressure activation is required. This can be achieved by the liquid in the liquid store 76 already being subjected to pressure, for example via a propellant or a prestressed spring, at the production stage of the dispenser.

Figure 3A:
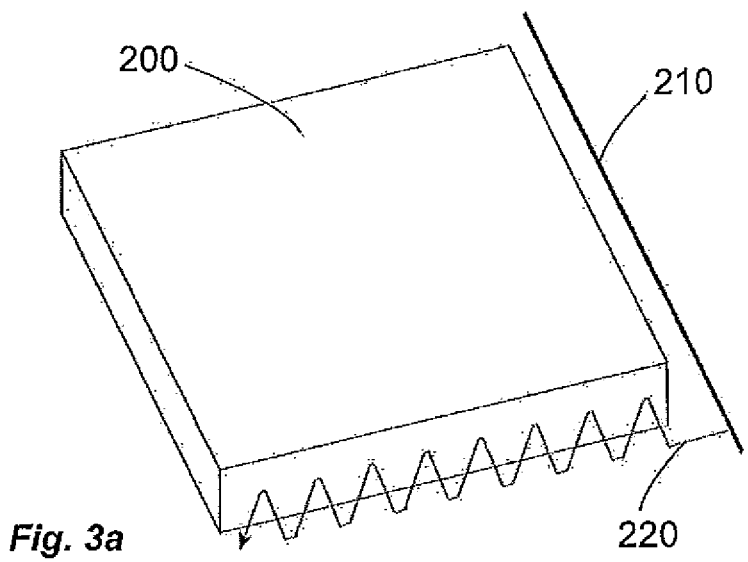
Figure 3B:
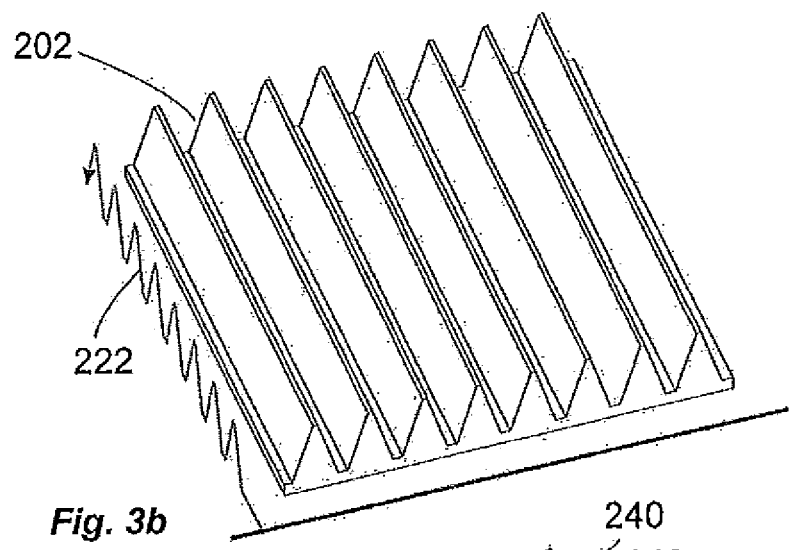
Figure 3C:
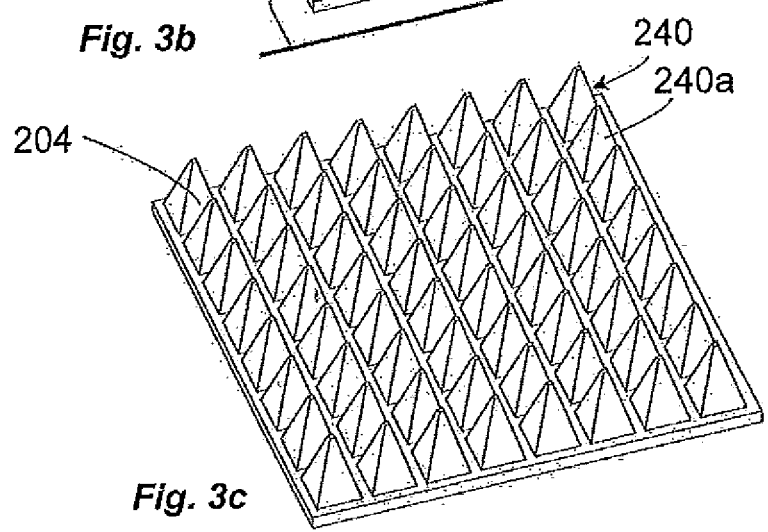

The elevations on the moulds, which serve for keeping the dispensing channels free, are produced preferably in the manner outlined in FIGS. 3*a* to 3*c*. As can be gathered from FIG. 3*a*, for this purpose, proceeding from an in particular metallic blank 200, a multiplicity of parallel grooves are introduced into said blank 200. This is done preferably by means of an eroding wire 210, which is guided through the blank in a zigzag movement along the path 220. The orientation of the eroding wire 210 remains unchanged here. Once the parallel grooves 202 have been produced in a manner corresponding to FIG. 3*b*, this procedure is repeated using an eroding wire 210 displaced through 90°, said wire, once again, being guided through the blank 200 in a zigzag movement along the path 222. This results in the elevations 240 illustrated in FIG. 3*c*. The use of an eroding wire here is advantageous, but is not the only option. Instead, it would also be possible for the grooves to be produced by cutting. It is also possible, instead of grooves 202, 204 being introduced in two directions offset in relation to one another through 90°, for the orientation of the eroding wire 210 to be changed three times or more. Orienting the eroding wire, during production, in three directions which are offset in relation to one another through 60° in each case gives rise to a structure with elevations which each have three, instead of four, side surfaces 240*a*.

Figure 4A:
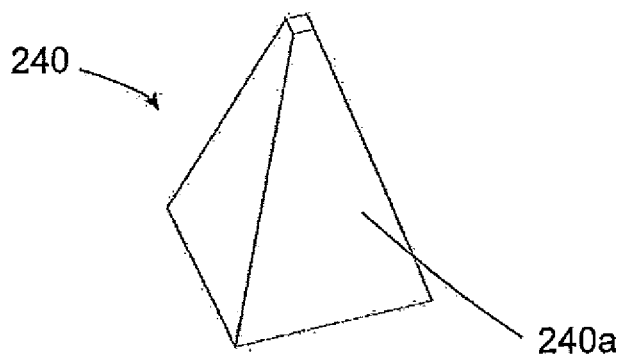
FIGS. 4a to 4c show different variants for shaping the elevations.
Figure 4B:
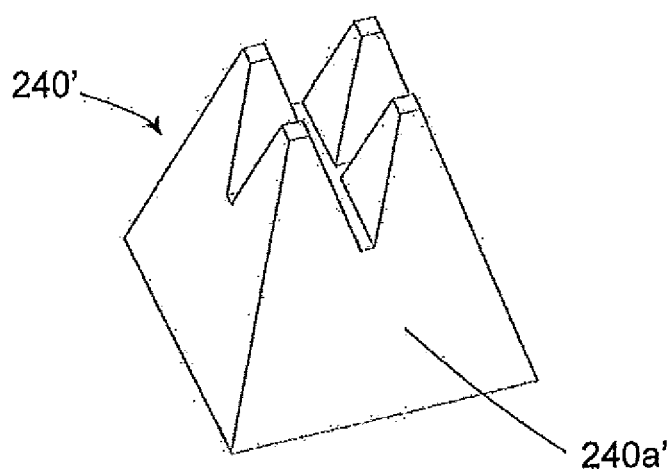
Figure 4C:
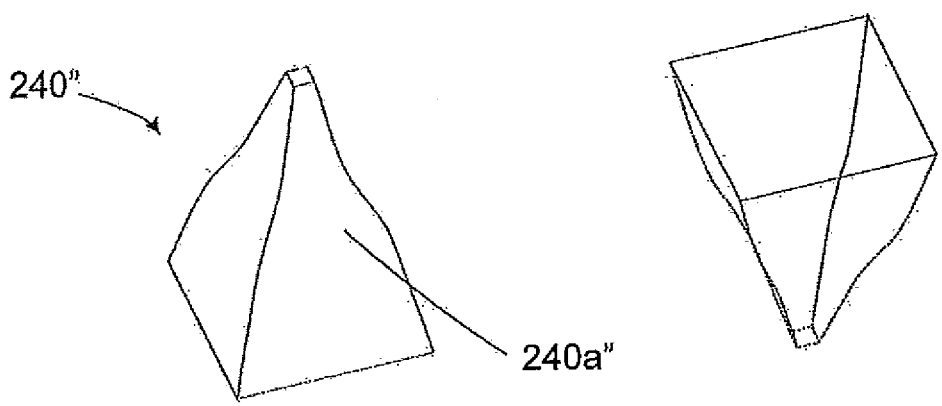

In particular using the eroding wire also makes it possible to provide shapings for the elevations 240 other than the straightforward truncated pyramid of FIG. 4*a*. For example, FIG. 4*b* shows that an appropriate movement path of the eroding wire 210 also makes it possible to have a configuration 240', in which a plurality of openings on the outside of the perforated plate are assigned to a common opening on the inside of the perforated plate. Furthermore, FIG. 4*c* shows that the side surfaces 240*a''* of the elevation 240'' need not themselves be planar. This makes it possible to produce shapings which provide flow-related advantages in line with the liquid which has to be dispensed. Moving the eroding wire 210 transversely to its direction of extent, however, means that, even in the case of a configuration like that of FIG. 4*c*, the normal vectors to a respective side surface 240*a''* are located in a common normal-vector plane or parallel thereto.

FIG. 4*c* illustrates on the right, by way of example, the shaping of the dispensing openings 60*a* provided by a corresponding shaping of the elevation 240''.

This description of the different aspects of the invention has described individual features only in the context of the mould. Since the method of producing the mould affects that mould, and since this mould, in turn, influences the shape of the perforated plate according to the invention, the corresponding features should also each be considered as being disclosed in respect of the perforated plate itself.

The invention claimed is:

1. A perforated plate for a dispenser for dispensing liquid, wherein:
   the perforated plate is produced as a plastics part by injection moulding;
   the perforated plate has a multiplicity of dispensing openings passing therethrough, wherein each of the dispensing openings taper from a first side of the perforated plate to a second side of the perforated plate;
   the perforated plate has at least 25 dispensing openings, wherein said dispensing openings are arranged such that at least five dispensing openings are provided per $mm^2$;
   the dispensing openings are bounded by a plurality of side surfaces and the side surfaces of a plurality of dispensing openings are aligned with one another; and
   the dispensing openings each have between 3 and 6 side surfaces.

2. The perforated plate according to claim 1, wherein:
   there is provided for the injection moulding a mould with two mould halves which, together, define a cavity which is filled with plastics material during the injection moulding, with
   the first mould half having a planar abutment surface directed towards the cavity, and
   the second mould half having a multiplicity of elevations rising up over a base surface; and
   in the closed state of the mould, distal contact regions at the distal ends of the elevations abut against the abutment surface, and the distal contact regions therefore keep the dispensing openings free of plastics material when the plastics material is being injected.

3. The perforated plate according to claim 1, wherein:
   the dispensing openings have a minimal cross section in each case on an outside of the perforated plate, with a free cross-sectional surface area of the dispensing openings on the outside being between 25 $\mu m^2$ and 10 000 $\mu m^2$.

4. The perforated plate according to claim 1, wherein:
   said side surfaces are each formed such that all normal vectors to any desired part of the side surfaces are arranged in a common normal-vector plane or parallel to said plane.

5. The perforated plate according to claim 1, wherein:
   a first normal-vector plane of one of the side surfaces of a first one of the dispensing openings is arranged parallel to a second normal-vector plane of one of the side surfaces of a second one of the dispensing openings.

6. The perforated plate according to claim 1, wherein:
   the number of side surfaces is 4.

7. The perforated plate according to claim 1, wherein:
   the side surfaces of the dispensing openings enclose an angle between 7.5° and 45° with a surface normal to a base surface of the perforated plate.

8. The perforated plate according to claim 7, wherein:
   the side surfaces of the dispensing openings enclose an angle between 15° and 22.5°.

9. The perforated plate according to claim 1, wherein:
   the perforated plate has a thickness between 0.1 and 1.5 mm.

10. The perforated plate according to claim 9, wherein:
    the thickness is between 0.2 and 0.8 mm.

11. A Nozzle unit for a dispenser for dispensing liquids, wherein:
    the nozzle unit has the perforated plate according to claim 1; and a fastening frame, connected in one piece to the perforated plate, encloses the perforated plate and is for securing on a dispensing head of the dispenser.

12. A dispenser for dispensing liquids, having a liquid store, a nozzle unit and a connecting channel, which connects the liquid store to the nozzle unit, wherein:
the nozzle unit has the perforated plate according to claim 1; and
a fastening frame connected in one piece to the perforated plate, encloses the perforated plate and is for securing on a dispensing head of the dispenser.

13. The dispenser according to claim 12, wherein: the dispenser: has a manual pumping mechanism, by which liquid is pressure-activated out of the liquid store, wherein the pressure activation pushes the liquid through the dispensing openings of the perforated plate; or has an outlet valve, which is arranged upstream of the perforated plate, and a pressure store, by which liquid in a liquid store of the dispenser is subjected to pressure on a permanent basis, wherein opening of the outlet valve allows the liquid to flow to the perforated plate and the liquid to be dispensed through the perforated plate.

14. A dispenser for dispensing liquids, having a liquid store, a nozzle unit and a connecting channel, which connects the liquid store to the nozzle unit, wherein:
the nozzle unit has the perforated plate according to claim 1.

15. A perforated plate for a dispenser for dispensing liquid, wherein: the perforated plate is a plastics part; the perforated plate has a multiplicity of dispensing openings passing therethrough, wherein each of the dispensing openings taper from a first side of the perforated plate to a second side of the perforated plate; the perforated plate has at least 25 dispensing openings, wherein said dispensing openings are arranged such that at least five dispensing openings are provided per mm2; and each of the dispensing openings are bounded by 3 to 6 side surfaces and the side surfaces of a plurality of the dispensing openings have at least a portion of one of the side surfaces thereof that are parallel with one another.

16. The perforated plate according to claim 15, wherein:
the dispensing openings have a minimal cross section in each case on an outside of the perforated plate, with a free cross-sectional surface area of the dispensing opening on the outside being between 25 $\mu m^2$ and 10000 $\mu m^2$.

17. The perforated plate according to claim 15, wherein:
said side surfaces are each formed such that all normal vectors to any desired part of the side surfaces are arranged in a common normal-vector plane or parallel to said plane.

18. The perforated plate according to claim 15, wherein:
a first normal-vector plane of one of the side surfaces of a first one of the dispensing openings is arranged parallel to a second normal-vector plane of one of the side surfaces of a second one of the dispensing openings.

19. The perforated plate according to claim 15, wherein:
the number of side surfaces is 4.

20. The perforated plate according to claim 15, wherein:
the side surfaces of the dispensing openings enclose an angle between 7.5° and 45° with a surface normal to a base surface of the perforated plate.

* * * * *